Patented Aug. 28, 1928.

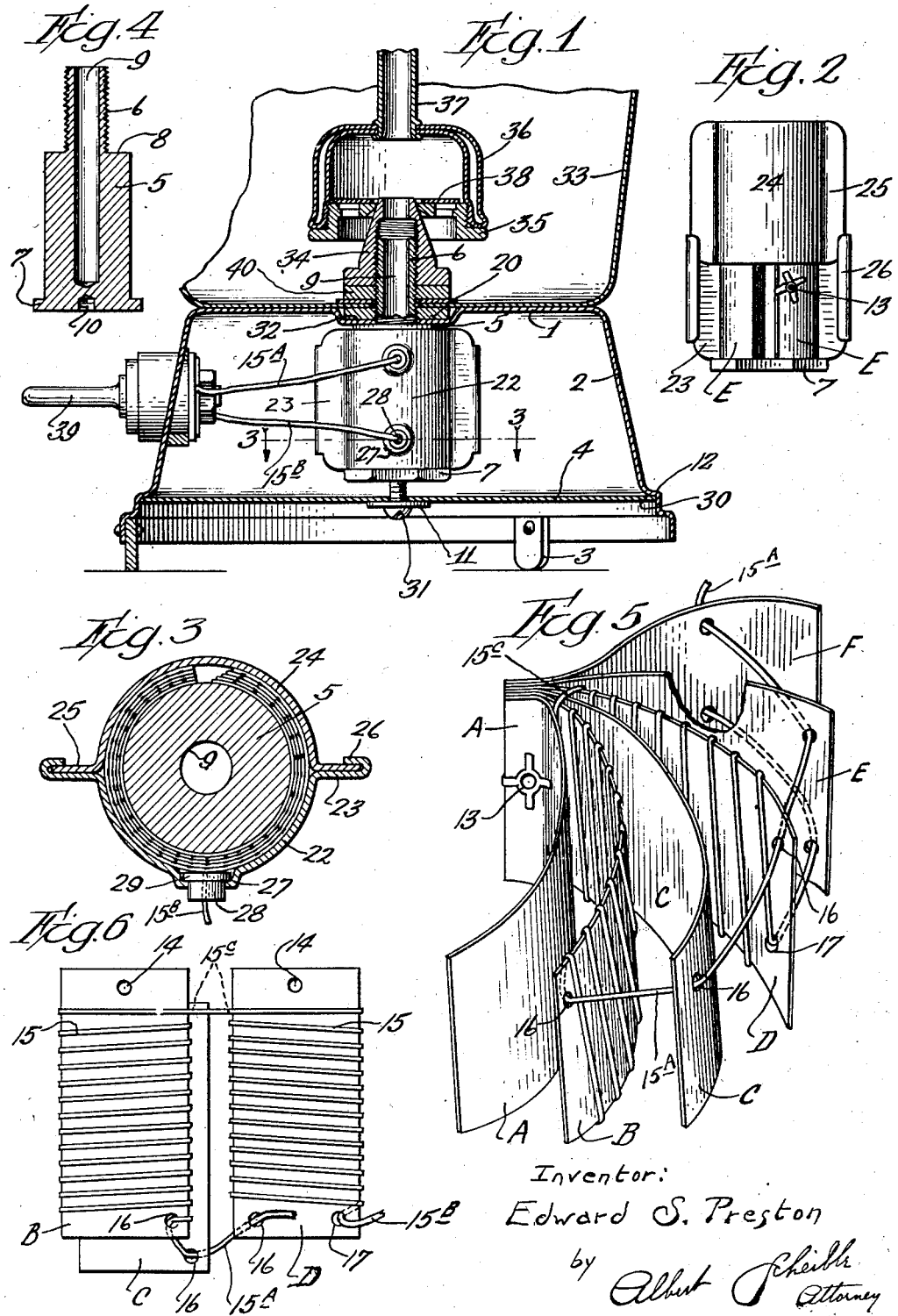

1,681,951

UNITED STATES PATENT OFFICE.

EDWARD S. PRESTON, OF CHICAGO, ILLINOIS, ASSIGNOR TO CHICAGO ELECTRIC MANUFACTURING COMPANY, OF CHICAGO, ILLINOIS, A CORPORATION OF ILLINOIS.

HEATING UNIT FOR ELECTRICALLY-HEATED UTENSILS.

Application filed January 23, 1928. Serial No. 248,827.

My invention relates to electrically heated appliances in which the heating member is disposed below the heat-utilizing portion of the appliance, and in some of its general objects aims to provide an unusually efficient and inexpensive basal heating unit for interchangeable use with heat consuming utensils.

More particularly, my invention relates to electrically warmed liquid heaters in which the heating member is disposed below the liquid, and in which this heating member is preferably confined within a closed chamber to deter radiation of heat from it to the outer air. In electrically heated utensils of this class, and particularly in coffee percolators for household use, the heating action is more efficient and expeditious if the heat of the heating member is concentrated upon a quite small portion of the liquid, instead of having this heating member disposed for warming the entire body of liquid. It is also commercially desirable to have the heating unit of such an appliance arranged so that it can readily be attached interchangeable to liquid containers of different sizes and shapes, and to have the construction of the heating member both simple, durable and inexpensive.

In some of its important objects, my invention aims to provide a heating unit (or base member) for a percolator or other liquid heater, which will meet the above requirements and which will be particularly suitable for use as the heating unit of a coffee percolator. More particularly, my invention aims to provide a cheaply and easily manufactured, basal heating unit for such purposes, having the following desirable characteristics:

(1) A unitary assembly of the heating member and the utensil-supporting base, with a heat-conducting well and a false bottom for the base, all arranged for easy attachment to any liquid container which has a perforation in its bottom.

(2) A mounting of the heating member on the heat-conducting well to concentrate the heat on this well.

(3) A firm supporting of the bottom of the hollow base or casing from the heat-conducting well, thereby avoiding the need of auxiliary supporting means for this bottom, and an arrangement for this purpose which will conduct very little heat to the said casing bottom.

(4) A simple and effective clamping of the heating member to the heat-conducting well.

(5) A novel construction of the heating member which will permit this to be assembled from flat parts and thereafter curved tightly about the well.

(6) Novel provisions for insulating the wires leading to the heating member and for retaining the needed insulators in their proper positions.

Further and also more detailed objects will appear from the following specification and from the accompanying drawings, in which Fig. 1 is a central and vertical section through a heating unit embodying my invention and through the lower portion of a coffee percolator mounted on this unit.

Fig. 2 is an elevation of the heating unit and oil well, taken in the opposite direction from Fig. 1, showing a partially detached position of one of the two clamping members which clamp the heating member to the heat-conducting well.

Fig. 3 is an enlarged horizontal section, taken along the line 3—3 of Fig. 1.

Fig. 4 is a central and vertical section through the heat-conducting well.

Fig. 5 is a perspective view of the wire-wound heating member and the bushings for insulating the lead wires to it, with the laminations of the heating member spread apart and with a portion of one insulating lead broken away.

Fig. 6 shows three of the intermediate leaves or laminations of the heating member and the disposition of the high resistance wire with respect to these leaves before they are assembled as the medial three laminations of the heating member.

In the embodiment of Fig. 1, my percolator heating unit includes a casing having a generally flat casing top 1 and a downwardly flaring side portion 2 (which side portion carries feet 3 for supporting it) and a casing bottom 4 disposed above the said feet. Disposed within the chamber as thus formed is a heating unit consisting of a hollow core which also serves as a liquid well, a heating member surrounding the main portion of this core, and a clamp pressing the heating member tightly against the said core.

This liquid well-forming core of my liquid heating unit is of metal and comprises a cylindrical main portion 5, an upper threaded stem 6 of smaller diameter than the said main portion, and a radially enlarged lower end 7. The top 1 of the heater-unit casing has a perforation through which the threaded stem 6 extends upwardly, and a nut 7 threaded on this stem above the said top clamps this top against the annular shoulder 8 which connects the upper end of the main body portion 5 of the core with the lower end of the threaded stem 6. A well forming bore 9 extends downwardly through the said stem and through the major portion of the cylindrical body portion 5, but terminates sufficiently above the bottom of the flange 7 to allow room for an upwardly threaded bore 10, sealed from the well bore 9 by intervening metal. Threaded into this lower bore 10 is a screw 11 which supports the bottom 4 and clamps the peripheral portion of the latter against a suitable stop on the casing, such as an annular shoulder 12.

Surrounding the cylindrical body portion 5 of the core (which core is shown separately in Fig. 4) is a heating member which is held tightly against this body portion by suitable clamping means. This heating member comprises one or more mica sheets upon which a high resistance wire 13 is wound, together with mica sheets at opposite sides of the wire wound sheets, the length of all of the sheets being slightly shorter than the circumference of the said cylindrical body portion 5. To accommodate a length of the high resistance wire suitable for use on an ordinary 110 volt circuit without employing an undesirably small diameter of the wire or an unduly close spacing of adjacent portions of the wire, I desirably employ two wire-wound sheets and desirably guide the lead portions of the wire so as to facilitate the construction and assembly of the heating member.

Illustrative of a desirable winding and assembling of the sheets, leaves or laminations of such a heating member, Fig. 5 shows such a heating member with its sheets or leaves spread apart. This heating member includes six sheets of mica or other flexible insulating material, each of which desirably corresponds in width to the height of the cylindrical portion 5 of the heater core. The proposed inner sheet A is preferably slightly shorter than the circumference of the said core portion 5, and in practice the other five sheets may either be of the same length or slightly longer.

The second and fourth sheets (B and D) have the high resistance wire 15 wound consecutively on them, the interposed third sheet C insulates the windings on the said two sheets from each other, while the sheets A and E form outer face insulations for the windings on the sheets B and D. Then the sixth sheet E affords an insulation between the clamping members (22 and 24) and the wire lead portions, and this heet E also permits the said lead portions to issue from the heating member at some distance from the free ends of the united sheets of this member.

To construct such a heating member, I provide six mica sheets of approximately equal sizes, each provided near one end with a perforation 14 for receiving a fastener 13 which afterwards secures the sheets together into a pack. Four of the proposed intermediate sheets (B, C, D and E) are each also provided near their other end (and desirably near one corner) with a wire lead perforation 16, and two of these sheets (D and E) each have an additional perforation 17 at this same end. Then the sixth or outside sheet F has two perforations 18 and 19 spaced from the last named end and desirably about midway between the ends of this outside sheet.

Starting with such perforated sheets, I first wind the high resistance wire 15 upon the two sheets B and D with the connecting wire portion 15$^C$ of sufficient length so that these sheets can be spaced slightly from each other—as shown to an exaggerated extent in Fig. 6. One lead portion 15$^B$ of the wire extends through the corner perforation 17 of the sheet D, while the other lead portion 15$^A$ of the wire extends successively through the corner perforations 16 in the sheets B, C and D. The sheet D is then swung back under the sheet C (viewed as in Fig. 6) to bring the perforations 16 in the three sheets into alinement, and the plain inner mica sheet A is placed against the face of the sheet B which is shown in Fig. 6. Then each of the two wire lead portions is slipped successively through one of the corner perforations in the sheet E and through one of the medially disposed perforations (18, 19) in the outer sheet F. When the six sheets are then stapled together by the fastener 13, the wire portions are disposed as in Fig. 5, after which the lead wire portions can readily be drawn taut to dispose the portions 15$^A$ and 15$^B$ (of Fig. 5) snugly between the sheets E and F. During the folding back of the sheet D in the initial three-sheet assembly, the connecting wire portion 15$^C$ (of Fig. 6) is disposed so as to extend over the alined edges of the sheets B, C, and D (as shown in Fig. 5), and in practice the wire windings are readily drawn so taut as to indent into the edges of the sheets. However, an insulating washer might obviously be interposed between the upper end of the sheet assembly and the top 1 of the heater unit casing.

By using thin sheets of mica or the like, I readily provide a heating unit which can be curved snugly about the core body 5 and which can be pressed tightly against this body by any suitable clamping means, while interposing only thin layers of insulation between this core and the heating wire. As a desirable clamping means, I am showing a clamp comprising two substantially semi-tubular clamping members 22 and 24, each of which has end wings (23 and 25 respectively), with fingers 26 at the ends of the wings 23.

By turning these fingers 26 over the ends of the wings 25, I interlock the two clamping members with each other. In practice, these fingers may initially be spread somewhat open, so that the clamp half 25 which carries the wings 25 can be slid into position (after the manner of Fig. 2) when the other clamp half is already pressing the curved heating member against the core. Then the fingers 26 can afterwards be flattened against the wings 25, as shown in Fig. 3, thereby causing the clamp to press the heating member tightly against the core body 5.

To afford suitable outlets for the lead wire portions, I preferably provide one of the clamp halves with a pair of perforated bosses 27 each of which is shaped for retaining the head 29 of an insulating bushing 28 slipped over one of the wire lead portions, so that the assembling of the clamp causes this to hold these wire-protecting bushings in effective positions. The resulting combination of the metal heat-transmitting core with the heating member clamped to it forms a compact and easily manufactured assembly which can readily be clamped to the top of the casing of the heating unit by a nut 20, while the lead wire portions 15^A and 15^B are connected to plug terminals 39, here shown as insulatingly supported by the side wall 2 of the said casing. If the heating member should burn out, the said assembly can quickly be detached and replaced in its entirety even by an amateur, or a new heating member alone can be substituted for the former one.

To attach my heating unit to the casing 33 of a liquid container, the latter merely needs to have a bottom perforation through which the hollow threaded stem 9 of the metal core may extend, so that the lower portion of the container can be slid down over the said stem, after which the container bottom is clamped down by a nut 40 threaded on the stem. For a percolator, the said stem 9 is made long enough to have a cup-support 34 screwed upon it above the nut 40, which support is shaped to fit the usual bottom 35 of the pump cup 36. This cup is here shown as having the usual hollow side 36 clinched to the riser tube 37, and as housing a loose washer 38 which is intermittently raised to admit cooler liquid.

When thus employed in connection with a coffee percolator, the well bore 9 houses only a quite small portion of the water at any one time and the water in the well has a relatively large surface area subjected to the heat transmitted to it by the metal core. Consequently, this small body of water is very quickly heated to its boiling point, so that such a percolator requires an unusually short time for beginning its percolating action. Moreover, the thickness of the core wall around the well permits the storing of heat, while the spacing of the bottom 4 from the core and the relatively small size of the screw 31 allows only a small conduction of heat to this bottom. So also, the relatively small area of the shoulder 8 which engages the top 1 of my heating unit in proportion to the inner surface of the well bore permits this shoulder to transmit only a relatively small amount of heat to the casing of percolator, so that I secure a prolonged percolating action long before the body of water in the percolator is materially heated. Moreover, this concentration of the heat on the liquid in the well can be further increased by interposing an insulating washer between the annular shoulder 8 and the top 1 of the heater unit casing, as previously described.

By having the wires from the heating member issue medially of its length, I facilitate the attaching of this member to the heat-transmitting core, as digital pressure against the clamp half which slips over the insulating bushings (namely, the lower clamp half in Fig. 3) will leave only short end portions of the heating member projecting at opposite sides of the core and these end portions are easily curved against the core by the other clamp half. The use of the supplemental outer insulating sheet F with perforations medial of its length permits this advantageous arrangement, although I do not wish to be limited to it.

To adapt my heating unit for interchangeable use with liquid containers, I preferably provide the top 1 of its casing with a depression through which the perforation for the stem 6 extends, and employ a nut 20 of less height than the depth of this depression. When thus constructed, my heating unit can easily be attached to percolators (or other liquid containers) of varying shapes, it being only necessary to form a corresponding bottom perforation in such a container through which the stem 6 can extend. Consequently, a dealer or distributor can meet a diversified demand by carrying a stock of different shapes and sizes of the percolators or other utensils along with a much smaller number of my interchangeably attachable heating units.

However, while I have described my invention in an embodiment particularly suited for use with an electric percolator, with a heating member including two wire-wound sheets and a heating unit casing having a depressed top portion, I do not wish to be limited in these respects. Many changes may obviously be made without departing either from the spirit of my invention or from the appended claims.

I claim as my invention:

1. A heating unit for use with a flat-bottomed utensil, comprising a casing having a central depression in its top and a perforation through the said depression, a heat-transmitting member having its main portion within the casing and having a stem extending upwardly through the said perforation, and means housed by the depression and associated with the stem for clamping the said member to the said top.

2. An electric utensil heater comprising an upright and substantially cylindrical metal core, a unitary heating member slightly shorter than the circumference of the core and wrapped around the latter, and means for holding the heating member rigidly upon the core; the heating member comprising initially flat laminations secured to each other near one end only, so as to permit the laminations to slide upon each other while the heating member is being wrapped around the core.

3. An electric utensil heater comprising an upright end substantially cylindrical metal core, a laminated and initially flat unitary heating member slightly shorter than the circumference of the core and wrapped as a unit around the latter, and means for clamping the heating member to the periphery of the core, the core having a radial enlargement below the heating member for supporting the latter during the attaching of the clamping means.

4. For use with a heat-transmitting member, a heating member comprising superposed sheets of insulating material and a high resistance wire mounted on one of the intermediate sheets, and means for fastening the sheets together at one end, the sheets being otherwise free to move longitudinally with respect to one another.

5. For use with a heat-transmitting member, a heating member including five superposed sheets of flexible insulating material, a high resistance wire wound on the second and the fourth of the insulating sheets, and means clear of the insulating wire for fastening all of the sheets to each other, the sheets being unjoined at one end.

6. A heating member as per claim 4, including a sixth sheet of insulating material superposed on the aforesaid five sheets, the sixth sheet and sheet adjacent thereto having relatively offset perforations through which the high resistance wire extends.

7. A heating member adapted to be wrapped around a heat transmitting member, including five superposed sheets of flexible insulating material bound together at one end, and a high resistance wire wound on the second and the fourth of the said sheets and having a connecting wire portion extending over an edge of the third sheet.

8. A heating member adapted to be wrapped around a heat transmitting member, including five superposed sheets of flexible insulating material bound together at one end, and a high resistance wire wound on the second and the fourth of the said sheets and having a connecting wire portion extending over adjacent edges of the second, third and fourth sheets.

9. A heating member as per claim 7, in which the high resistance wire includes a lead portion extending from the said second sheet through the third, fourth and fifth sheets, and another lead portion extending from the fourth portion through the fifth sheet.

10. A heating member as per claim 7, in which the high resistance wire includes a lead portion extending from the said second sheet through the third, fourth and fifth sheets, and another lead portion extending from the fourth portion through the fifth sheet, both of the said wire lead portions being adjacent to the same end of the pack of sheets.

11. A heating member as per claim 7, in which the high resistance wire includes a lead portion extending from the said second sheet through the third, fourth and fifth sheets, and another lead portion extending from the fourth portion through the fifth sheet, both of the said wire lead portions being adjacent to the same end of the pack of sheets; in combination with a sixth sheet superposed on the said fifth sheet and having two apertures substantially medial of its length, through which apertures the wire lead portions respectfully extend.

12. In an electric heating device, a heat-transmitting core, a flexible heating member wrapped around the core and including a high resistance wire having wire lead portions projecting from a medial portion of the said member, insulating bushings slipped respectively upon the said lead portions and engaging the outer face of the heating member, and means for clamping the heating member to the core, the clamping means being arranged for retaining the insulating bushings in their said position.

13. In an electric heating device, a heat-transmitting core, a flexible heating member wrapped around the core and including a high resistance wire having wire lead portions projecting from a medial portion of the said member, insulating bushings slipped respectively upon the said lead portions and engaging the outer face of the heating member, and a clamp holding the heating member to the core, the clamp having perforations through which the insulating bushings project and each of the said bushings having an inner head held close to the heating member by the clamp.

14. A heating device construction as per claim 13, in which the clamping means comprise two clamp halves interlocked with each other, one of the clamp halves having perforations through which the insulating bushings project.

Signed at Chicago, Illinois, January 20th, 1928.

EDWARD S. PRESTON.